United States Patent [19]

Igaki

[11] Patent Number: 5,327,218
[45] Date of Patent: Jul. 5, 1994

[54] METHOD AND APPARATUS FOR MEASURING DISPLACEMENT BY USING A DIFFRACTED INVERTED IMAGE PROJECTED ON A DIFFRACTION GRATING

[75] Inventor: Masahiko Igaki, Tokyo, Japan

[73] Assignee: Canon Kabushiki Kaisha, Tokyo, Japan

[21] Appl. No.: 144,496

[22] Filed: Nov. 2, 1993

Related U.S. Application Data

[63] Continuation of Ser. No. 791,371, Nov. 14, 1991, abandoned.

[30] Foreign Application Priority Data

Nov. 16, 1990 [JP]  Japan .................................. 2-310693
Oct. 15, 1991 [JP]  Japan .................................. 3-266230

[51] Int. Cl.⁵ .............................................. G01B 9/02
[52] U.S. Cl. ................................. 356/356; 250/237 G; 250/231.14
[58] Field of Search ................. 356/356, 363, 401; 250/237 G, 231.14, 231.15

[56] References Cited

U.S. PATENT DOCUMENTS

| | | |
|---|---|---|
| 3,245,307 | 4/1966 | de Lang . |
| 3,628,026 | 12/1971 | Cronin . |
| 3,628,870 | 12/1971 | Hayamizu . |
| 3,630,622 | 12/1971 | de Lang . |
| 3,768,911 | 10/1973 | Erickson . |
| 4,879,462 | 11/1989 | Stephens ................. 250/237 G |
| 4,976,072 | 10/1990 | Tesuji . |
| 4,979,826 | 12/1990 | Ishizuka et al. ................. 356/356 |

FOREIGN PATENT DOCUMENTS

| | | |
|---|---|---|
| 0365806 | 5/1990 | European Pat. Off. . |
| 3316144 | 11/1983 | Fed. Rep. of Germany . |
| 3923768 | 3/1990 | Fed. Rep. of Germany . |
| 61-178613 | 8/1986 | Japan . |
| 1176914 | 7/1989 | Japan . |
| WO8905440 | 6/1989 | PCT Int'l Appl. . |
| WO8905964 | 6/1989 | PCT Int'l Appl. . |
| WO9013006 | 11/1990 | PCT Int'l Appl. . |
| 1367886 | 9/1974 | United Kingdom . |

OTHER PUBLICATIONS

Vasco Ronchi, "Forty Years of History of a Grating Interferometer", Applied Optics, vol. 3, No. 4, pp. 437-451 (Apr. 1964).

Primary Examiner—Samuel A. Turner
Attorney, Agent, or Firm—Fitzpatrick, Cella, Harper & Scinto

[57] ABSTRACT

A scale having first and second optical gratings on both surfaces of a transparent parallel portion or a scale having a common optical grating with first and second optical gratings on one of the surfaces of the transparent parallel portion is prepared. A beam is radiated on the first optical grating of the scale to cause it to pass through the first optical grating, thereby two-dimensionally inverting an image of the first optical grating. The inverted image is projected on the second optical grating. The inverted image of the image of the first optical grating and the second optical grating are displaced in opposite directions upon movement of the scale. Relative displacement between the inverted image and the second optical grating is larger than the movement amount of the scale, thereby performing displacement detection with high resolution.

22 Claims, 8 Drawing Sheets

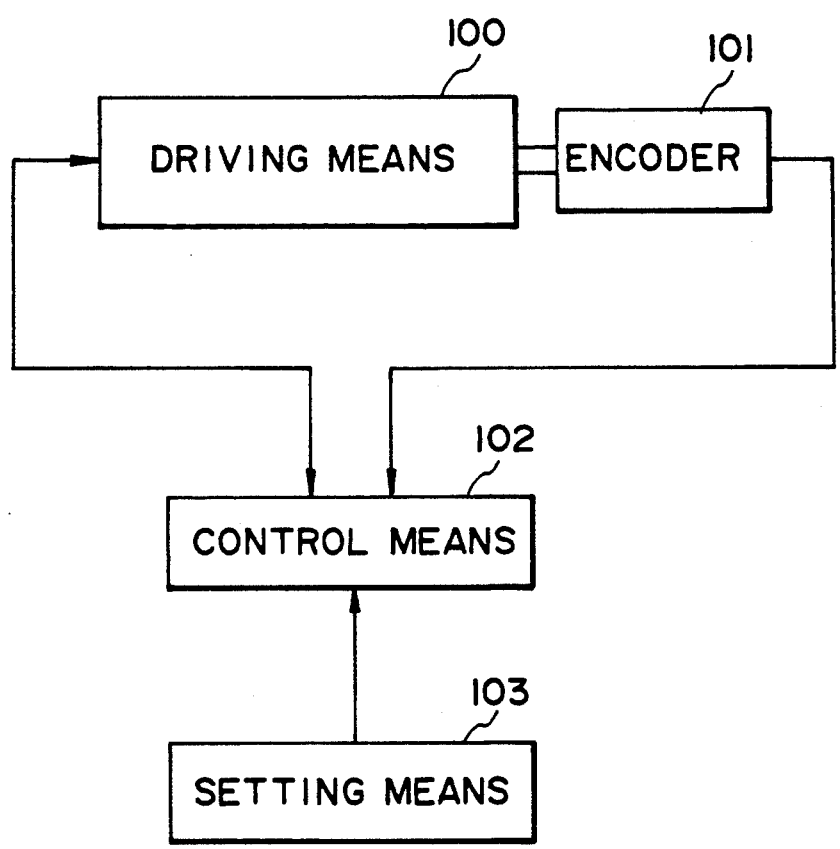
F I G. 10

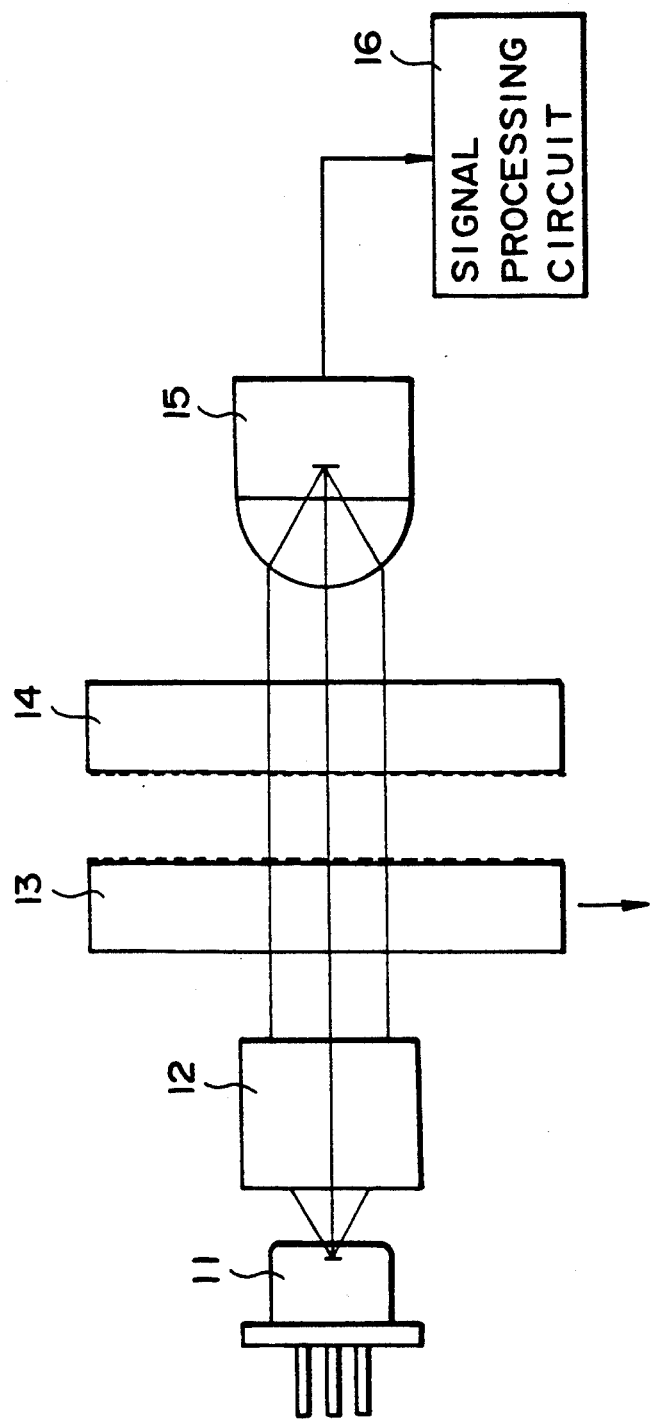
FIG. II
PRIOR ART

METHOD AND APPARATUS FOR MEASURING DISPLACEMENT BY USING A DIFFRACTED INVERTED IMAGE PROJECTED ON A DIFFRACTION GRATING

This application is a continuation of application Ser. No. 07/791,371, filed Nov. 14, 1991, now abandoned.

BACKGROUND OF THE INVENTION

1. Field of the Invention

The present invention relates to a field of displacement measurement for optically measuring displacement information such as a displacement amount and a displacement velocity of an object.

2. Related Background Art

Encoders have been conventionally used to optically measure displacement amounts and displacement velocities of objects. FIG. 11 shows a typical arrangement of a conventional optical encoder. This encoder includes a light source 11 for generating a light beam, a lens 12 for collimating the light beam, a movable scale 13 having grating slits and a stationary scale 14 having grating slits having the same pitch as that of the slits of the movable scale 13. Note that these grating slits have a pitch which does not substantially induce a diffraction effect. The encoder also includes a photodetector 15 for detecting amounts of light passing through the movable and stationary scales 13 and 14, and a signal processing circuit 16. With this arrangement, when the scale 13 moves, the light amount detected by the photodetector 15 is periodically changed in correspondence to scale movement. More specifically, when the phases of the two slits coincide with each other, viewing them from the light source side, a maximum light amount is detected. Also, when the phases of the two slits of the scales 13 and 14 are shifted by 180°, a minimum light amount is detected. When the movable scale 13 is moved by one pitch of the slits, a period signal having one period is obtained. In the signal processing circuit 16, this period signal is converted into signal pulses, and these pulses are counted to measure a displacement of the movable scale.

In the conventional encoder of the type using these two scales, i.e., the movable and stationary scales, the positions of the two scales must be aligned with each other, and the position of each scale must be aligned with the detection system. In order to increase the detection resolution, high assembly precision is required to result in high cost. To increase the detection resolution is to decrease the pitch of the slits. However, when the pitch is excessively decreased, diffracted light components are produced to degrade displacement measurement. For this reason, the increase in detection resolution in this encoder is limited.

SUMMARY OF THE INVENTION

It is an object of the present invention to solve the conventional problems described above and to provide a method and apparatus for measuring displacement at a high resolution by using a new measuring principle.

BRIEF DESCRIPTION OF THE DRAWINGS

FIG. 10 is a view showing an arrangement of a driving system having an encoder; and FIG. 11 is a view showing a conventional arrangement.

DESCRIPTION OF THE PREFERRED EMBODIMENTS

Figure 1:
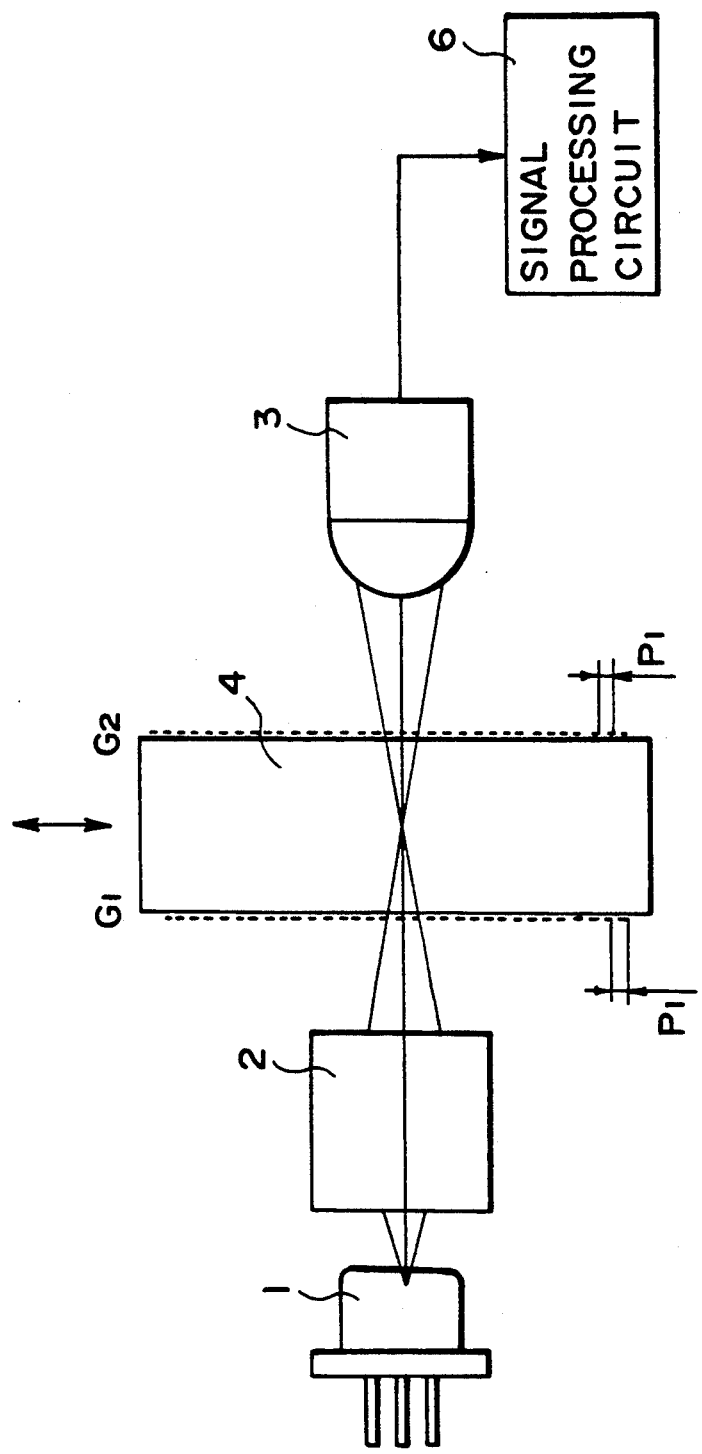
FIG. 1 is a view showing an arrangement according to the first embodiment of the present invention.
Figure 2:
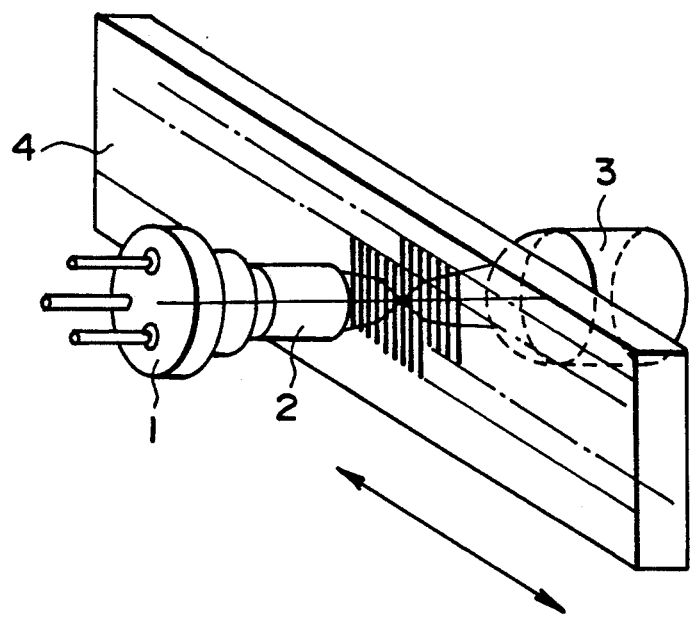
FIG. 2 is a perspective view of the first embodiment.

Preferred embodiments will be described in detail with reference to the accompanying drawings when the present invention is applied to encoders. FIG. 1 is a sectional view showing an arrangement of an optical system according to the first embodiment of the present invention. FIG. 2 is a perspective view showing an arrangement of the first embodiment. Referring to FIGS. 1 and 2, an encoder of this embodiment includes a semiconductor laser 1 for generating a coherent beam having a wavelength $\lambda$, and a lens system 2 for converting the beam from the semiconductor laser 1 into a convergent beam. The semiconductor laser 1 and the lens system 2 constitute a beam radiation means. Any coherent light source (such as an LED) can be used in place of the semiconductor laser. An optical linear scale 4 comprises transparent flat plates parallel to each other. A first optical grating G1 having a pitch P1 with a diffraction grating function is formed on one surface of the scale 4 on the side facing the beam radiation means. A second optical grating G2 having the same pitch P1 with a diffraction grating function is formed on the other surface of the scale 4. A photodetector 3 serving as a light-receiving means is located at an opposite position to the beam radiation means, the scale 4 being disposed between there. An output from the photodetector 3 is connected to a signal processing circuit 6 including a pulser, a counter, and the like to measure displacement information such as a displacement amount and a displacement velocity of the scale 4.

An operation of the optical system in the displacement measuring apparatus having the above arrangement will be described below. A beam from the semiconductor laser 1 is converged into a convergent beam by the lens system 2. This convergent beam is incident on the first grating G1 of the scale 4. The beam having passed through the first grating G1 is focused at a central position between the two grating surfaces formed in the scale 4. The convergent beam is then changed into a divergent beam from this central position. The divergent beam is incident on the second grating G2. A beam having passed through the second region, i.e., the second grating, is incident on the photodetector 3 serving as a light-receiving unit.

The principle of measurement according to the present invention will be described below. A phenomenon for forming an interference image by a convergent beam, which phenomenon is the assumption of the present invention, will be described below. Formation of an interference image by this convergent beam is known in a so-called Ronchi interferometer or the like. This phenomenon is described in, e.g., *APPLIED OPTICS* (April 1964/vol. 3, no. 4) in detail, and will be briefly described below.

Figure 3:
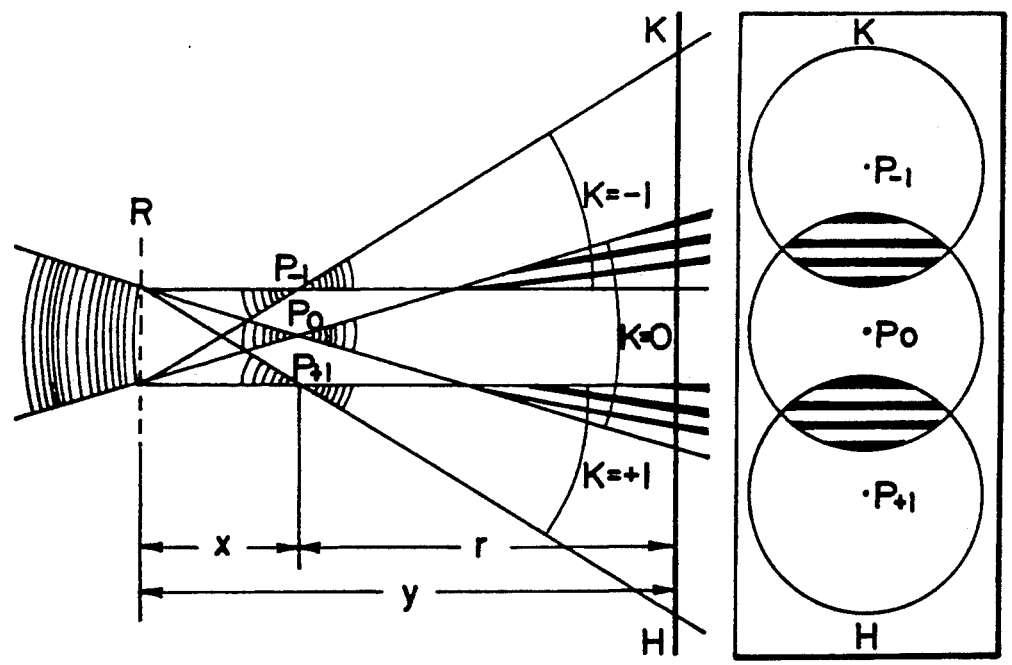
FIGS. 3 and 4 are views for explaining a phenomenon for forming interference fringes.

When a convergent beam obtained from an optical means such as a lens is incident on a diffraction grating, the beam is split into a large number of diffracted light components, as shown in FIG. 3. In particular, when +1st-, −1st-, and 0th-order diffracted light components are taken as an example, these components are focused at points $P_0$, $P+1$, and $P-1$. The respective components changed to divergent components again are interfered and overlap each other to form interference fringes. As shown in FIG. 3, these interference fringes become evenly spaced linear grating images parallel to the grating intervals of the diffraction grating when a wave surface of incident light beam on the grating is a spherical wave. A grating pitch A of the grating images is given as follows:

$$A = a(r/x)$$

where a is the grating pitch value of the irradiated diffraction grating.

The Ronchi interferometer has been developed to test mainly lenses. The present invention is characterized in that this principle is further developed and is applied to displacement measurement. The characteristic features of the present invention reside in that a diffraction grating is irradiated with a convergent beam, and when the grating is displaced in a direction, diffracted images as a result of overlapping of diffracted light components once focused are shifted in a direction opposite to the moving direction of the grating by phase shifts of the respective diffracted light components. That is, the phenomenon in which the diffracted image is inverted is utilized in the present invention.

Figure 4:
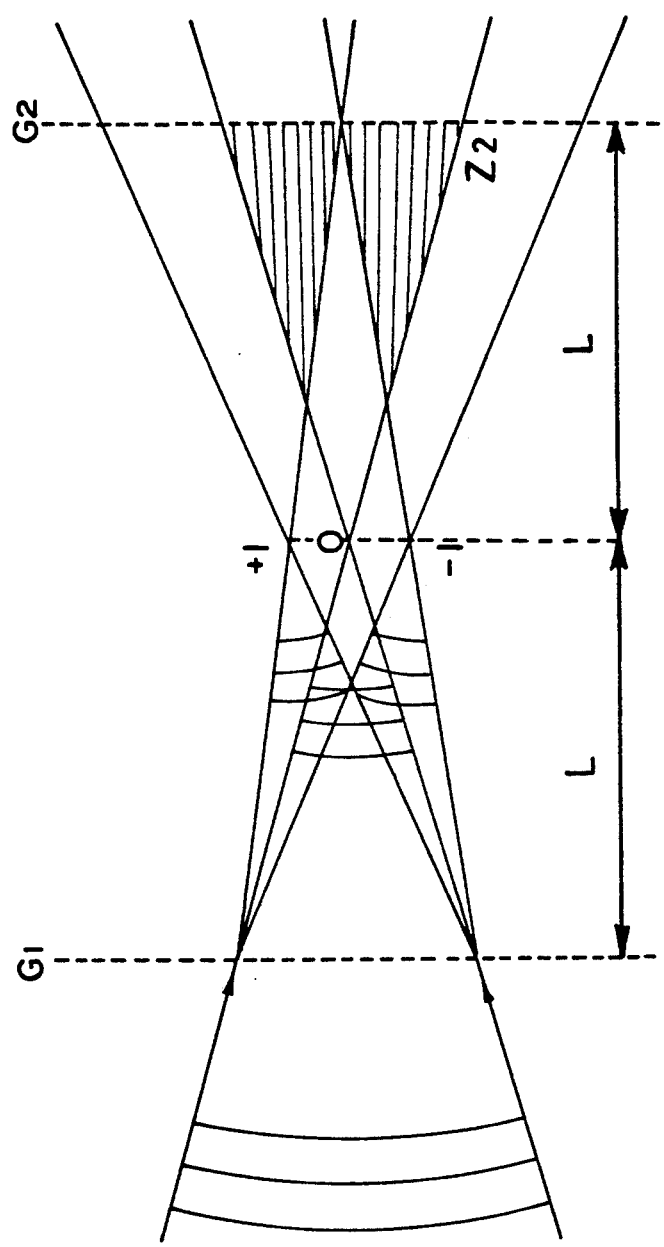

The behaviors of diffracted light components obtained upon incidence of a convergent beam on the grating G1 of the scale 4 will be described with reference to FIG. 4 illustrating the principle of measurement of the present invention. The beam incident on the grating G1 is split and passes through the grating G1 as a large number of diffracted light components. Interference images (e.g., a diffracted interference image by two or three light components) are formed in regions (latched portions) where +1st-, −1st-, and 0th-order diffracted components each having high energy level overlap each other. In particular, when a focal point of the convergent beam is located at a position away from the grating G1 by a distance L, an image-inverted diffracted grating image Z1 having the same pitch as that of the grating G1 is formed at a position away from the grating G1 by a distance 2L. For example, when the grating G1 is moved upward in FIG. 4, the image Z1 is moved downward. The diffracted grating image Z1 is formed on the second grating G2. Since the grating G2 is moved upward, the grating image Z1 and the grating G2 are moved in opposite directions. At this time, a relative displacement becomes substantially doubled. The interference fringe pattern formed by overlapping of the grating image Z1 and the second grating is shifted by one pitch of the interference fringe upon P/2 displacement with respect to a displacement P of the scale 4. As a result, the amount of light incident on the photodetector 3 is changed in accordance with moving of the grating unit, thereby obtaining an almost sinusoidal output signal. This signal is processed by the signal processing circuit 6, thereby detecting displacement information.

According to the present invention, the conventional stationary grating can be omitted to reduce the number of constituting parts. The position detection resolution can be represented by the sinusoidal output representing a pitch twice the optical grating pitch. In addition, the diffracted image is two-dimensionally inverted. Accordingly, even if an error occurs in the azimuth angle of the scale, this error does not adversely affect the measurement precision, thereby obtaining a stale signal having a high contrast level.

Figure 5:
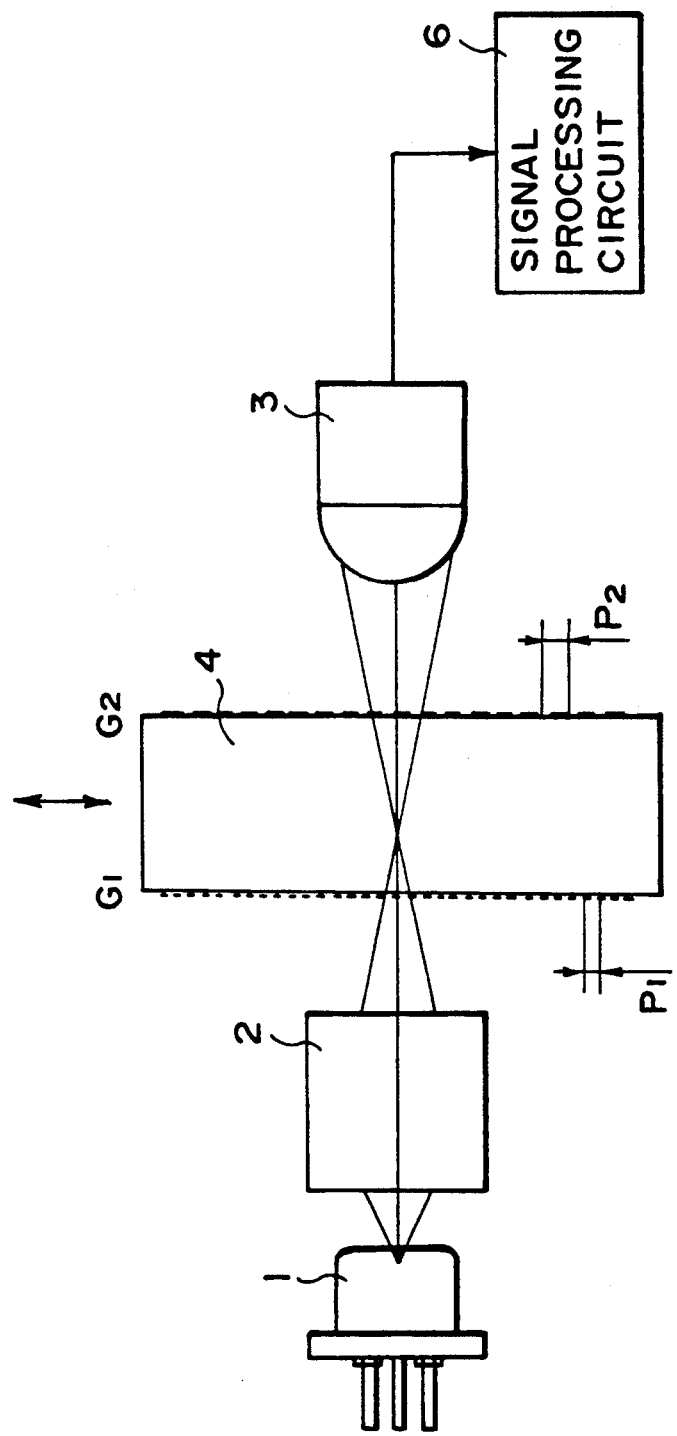
FIG. 5 is a view showing an arrangement according to the second embodiment of the present invention.

FIG. 5 is a view for explaining the second embodiment of the present invention. The overall optical layout of this embodiment is the same as that of the first embodiment, and a detailed description thereof will be omitted. Unlike in the first embodiment, a grating pitch of an optical grating G1 formed on a scale 4 is P1, a grating pitch of a second optical grating G2 is P2, and a focal position of the convergent beam is different from that in the first embodiment. The focal position of the convergent beam is spaced away from the first grating G1 by a distance L, whereby the same effect as in the first embodiment can be obtained in the second embodiment. The distance L is defined as follows:

$$L = T \times P1/(P1 + P2)$$

A diffracted grating image formed on the second grating G2 is displaced by the same magnification as (P2/P1) times upon displacement of the scale 4. The grating pitch of the overlapping optical gratings is P2 and the gratings are moved together with the scale 4. Therefore, a relative displacement amount is (1+P2/P1) times with respect to a displacement of the scale 4. As a result, the number of output pulses per unit displacement is (1+P1/P2)/P2.

Figure 6:
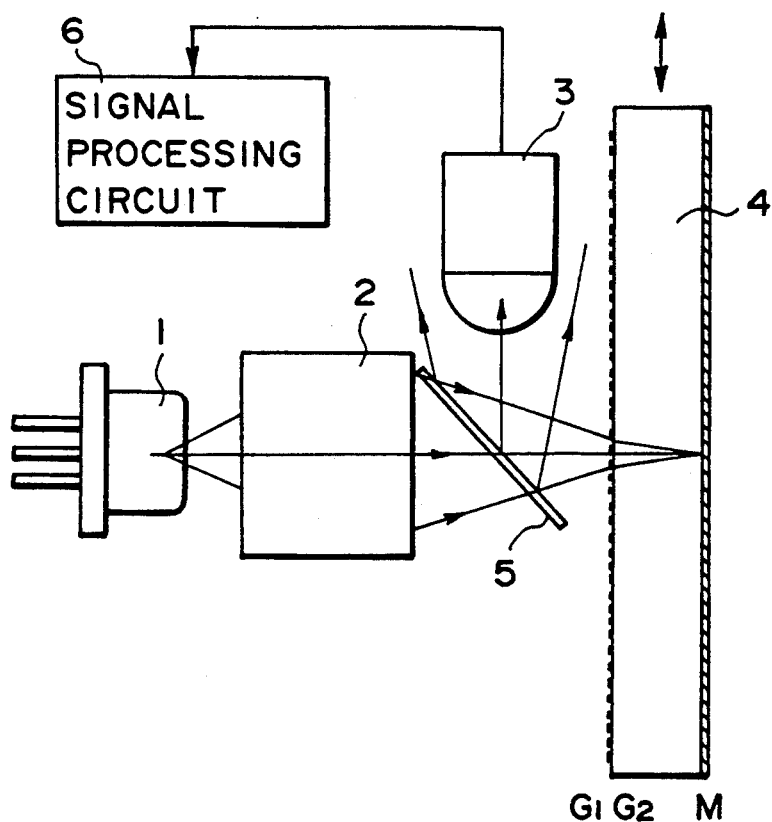
FIG. 6 is a view showing an arrangement according to the third embodiment of the present invention.

FIG. 6 is a sectional view of an optical system for explaining the third embodiment according to the present invention. The same reference numerals as in the previous embodiments denote the same parts in the third embodiment. The characteristic feature of the third embodiment resides in that first and second gratings are constituted by a single grating, thereby reducing the number of gratings. As shown in FIG. 6, the same optical grating as in the above embodiments is formed on one surface of a scale 4 on the side facing the light radiation means. A light-reflecting mirror surface M is formed on the other surface of the scale 4, and an optical layout is determined so that a focal plane of the convergent beam serves as the light-reflecting surface M. A half mirror 5 is formed between a lens system 2 and the optical scale 4 to guide a beam reflected by the light-reflecting surface of the scale 4 to a photodetecor 3.

The arrangement of this embodiment is equivalent to that obtained when a light-reflecting surface is located on a focal plane of a beam in the first embodiment. A beam is focused on the light-reflecting surface M to two-dimensionally invert the diffracted grating image to reflect thereon, whereby the inverted image is formed on the single grating again. At this time, since the direction of moving of the grating is opposite to that of the diffracted grating image, a relative displacement amount is substantially doubled, thereby obtaining a double pulse signal as in the previous embodiments. In the third embodiment, the grating is formed on only one surface of the optical scale, and the other surface can be constituted by the light-reflecting surface. Therefore, the scale can be easily manufactured to further reduce the fabrication cost.

Figure 7:
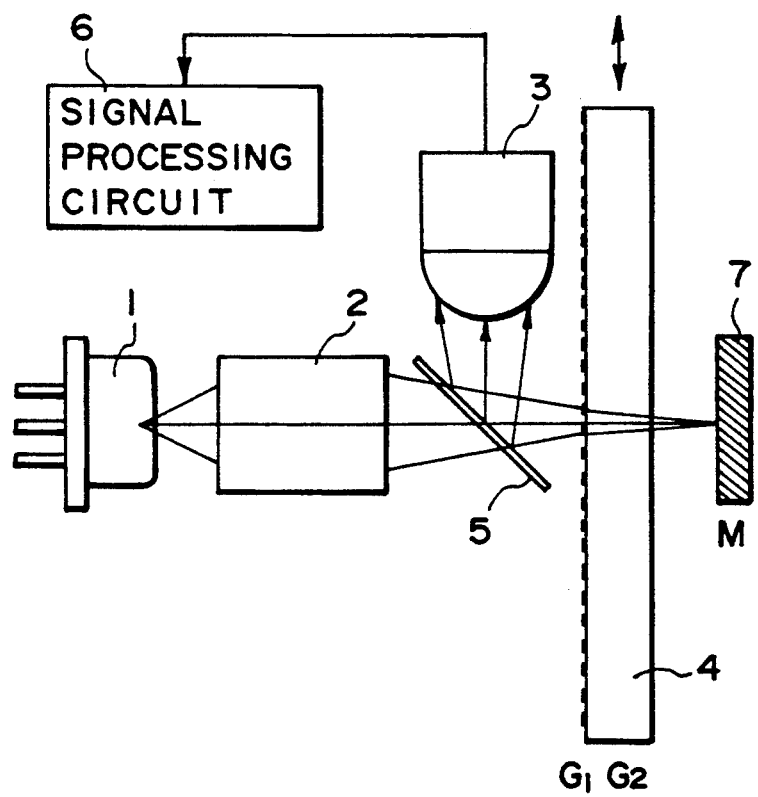
FIG. 7 is a view showing an arrangement according to the fourth embodiment of the present invention.

FIG. 7 is a sectional view of an optical system for explaining the fourth embodiment of the present invention. The same reference numerals as in the previous embodiments denote the same parts in the fourth embodiment. This embodiment is a modification of the embodiment shown in FIG. 6. First and second gratings G1 and G2 are constituted by a single grating, wherein a convergent beam is incident on the single grating as in the embodiment of FIG. 6. In this embodiment a diffraction grating is formed on a scale 4 on the light source side, and a mirror 7 is disposed at an opposite side to the light source with respect to the scale 4. The reflecting surface of the mirror 7 coincides with the focal plane of a convergent beam.

With this arrangement, a displacement measurement function is the same as that in the embodiment of FIG. 6. In the arrangement of the fourth embodiment, even if the grating of the scale 4 is axially shifted, the focal position is not changed. Therefore, an allowance of mounting precision of the scale 4 and the flatness of the scale 4 itself can be advantageously increased.

Figure 8:
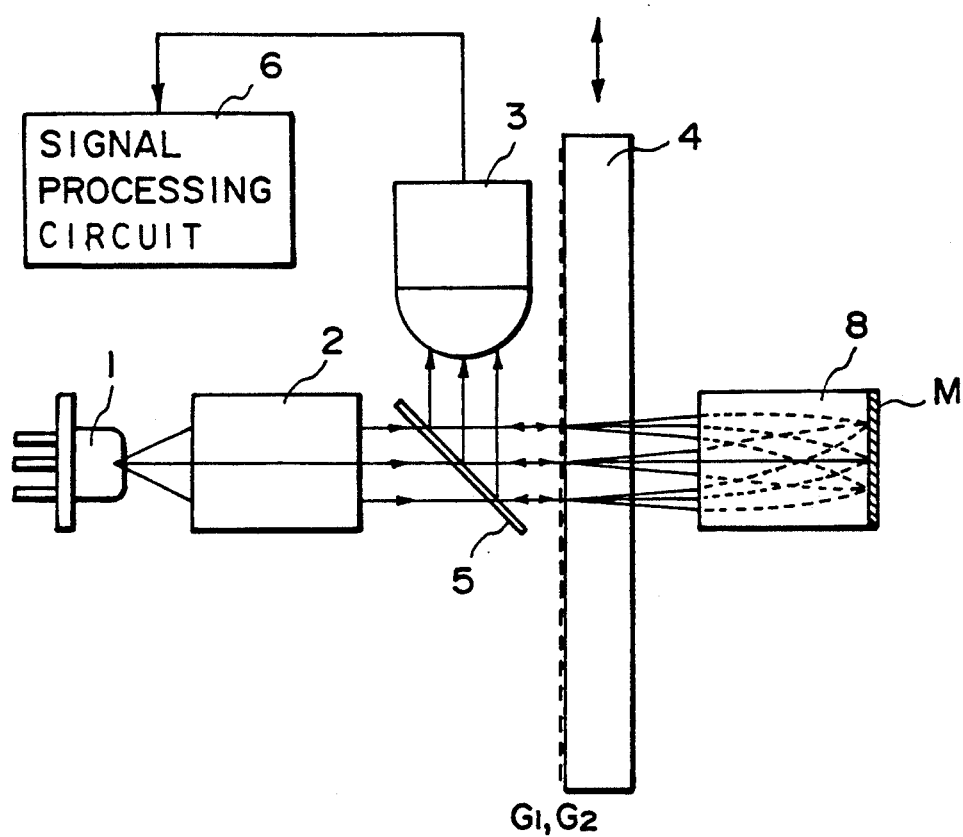
FIG. 8 is a view showing an arrangement according to the fifth embodiment of the present invention.

FIG. 8 is a sectional view of an optical system to explain the fifth embodiment of the present invention. The same reference numerals as in the previous embodiments denote the same parts. In this embodiment, an optical element 8 constituting a cat's-eye reflection system in which a lens portion and a reflection portion are integrally formed is arranged independently of the scale 4. A beam from a light source 1 is collimated into a collimated beam by the lens system 2. A beam having passes through a half mirror 5 and the scale 4 is reflected by the optical system 8. The diffracted image on the grating of the scale 4 is two-dimensionally inverted due to effect of the cat's-eye reflection system. As in all the embodiments described above, even if an error occurs in the azimuth angle of the scale, it does not adversely affect the measurement precision, thereby obtaining a stable signal having a high contrast level. The same effect as in the embodiment of FIG. 7, i.e., the arrangement free from an axial change of the scale, can be obtained. Since the collimated beam is incident on the grating, an interference range of the diffracted light components having passed through the grating can be increased wide, thereby obtaining a signal having a higher contrast level, which characteristic feature is unique to this embodiment. Although the collimated beam is used in the preferred embodiment of FIG. 8, a convergent beam may be incident on the scale, thereby serving us a displacement measurement apparatus.

Figure 9:
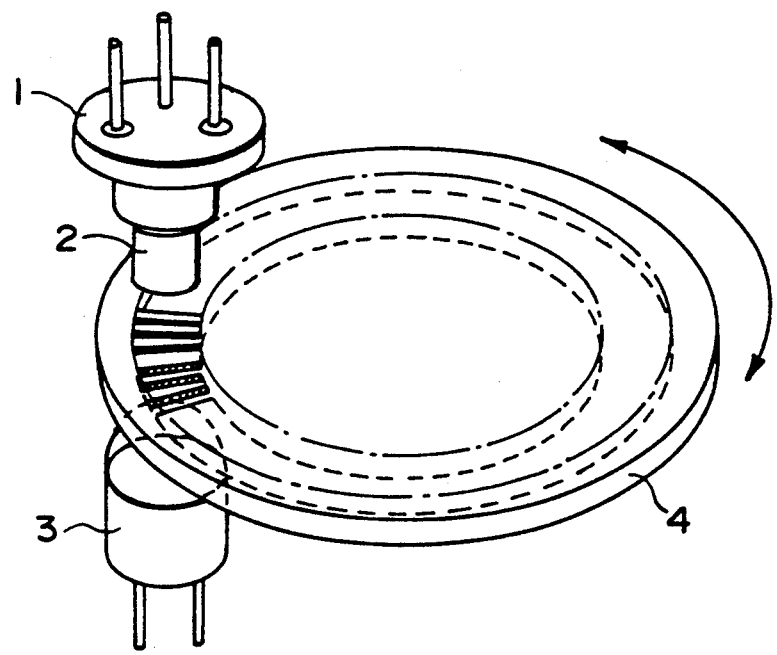
FIG. 9 is a view showing an arrangement obtained when the present invention is applied to a rotary encoder.

FIG. 9 is a perspective view of an arrangement in which the present invention is applied to a rotary encoder in place of the linear encoders of the above embodiments. In the embodiment of FIG. 9, a rotary scale is used in place of the linear scale, and first and second optical gratings are formed at the same radial concentric positions on the upper and lower surfaces of the scale. With this arrangement, rotation information of the rotary scale can be obtained by the same signal processing as that of the linear encoder. Displacement detection can be performed in the same arrangements as in FIGS. 6, 7, and 8.

FIG. 10 shows a configuration of a driving system having the linear or rotary encoder. A scale of the encoder is connected to a displacement portion of a driving means 100 having a driving source, such as a motor, an actuator, an internal combustion engine, to detect a displacement state such as a displacement amount or a displacement velocity. A detection output from an encoder 101 is fed back to a control means 102. The control means 102 transmits a driving signal to the driving means 100 so that the driving means 100 is set in a state set by a setting means 103. By this feedback system, a drive state set by the setting means 103 can be obtained. This driving system can be used in a variety of applications for various types of machine tools, manufacturing machines, measuring equipment, robots, cameras, video/audio equipment, information equipment, and apparatuses having driving mechanisms.

What is claimed is:

1. An apparatus for measuring displacement, comprising:
    a first optical grating;
    a second optical grating displaced together with said first optical grating in a given direction;
    an optical system for projecting a beam, having a focal point located between said first and second optical gratings onto said first optical grating, wherein the beam is split into overlapping diffracted light components forming diffracted images on said second optical grating shifted in a direction opposite to the displacing direction of said first optical grating; and
    means for detecting the beam having passed through said second optical grating.

2. An apparatus according to claim 1, wherein said first optical grating is formed on a beam incidence surface as one surface of a scale having a transparent parallel portion, and said second optical grating is formed on the other surface of said scale.

3. An apparatus according to claim 1, wherein said first and second optical gratings are comprised of a common grating disposed between a light source and a light-reflecting surface.

4. An apparatus according to claim 3, wherein said common grating is formed on the beam incidence surface of a scale having said transparent parallel portion, and said light-reflecting surface is formed on the other surface of said scale.

5. An apparatus according to claim 3, wherein said common grating is formed on the beam incidence surface of a scale having said transparent parallel portion, and a mirror member having a light-reflecting surface is arranged independently of said scale.

6. An apparatus according to claim 1, wherein said first and second optical gratings have the same grating pitch.

7. An apparatus according to claim 1, wherein said first and second optical gratings have different grating pitches.

8. An apparatus according to claim 1, wherein said optical system includes a semiconductor laser source.

9. An apparatus according to claim 1, wherein said first and second optical gratings are formed on a linear scale.

10. An apparatus according to claim 1, wherein said first and second optical gratings are formed on a rotary scale.

11. A method of measuring displacement, comprising the steps of:
    projecting a beam, having a focal point located between a first optical grating and a second optical grating displaced together with the first optical grating, onto the first optical grating, wherein the beam is split into overlapping diffracted light components;

projecting the beam onto the second optical grating, wherein diffracted images resulting from overlapping of the diffracted light components are formed on said second optical grating and are shifted in a direction opposite to the displacing direction of said first optical grating; and detecting the beam having passed through the second optical grating.

12. A method according to claim 11, wherein the first optical grating is formed on a beam incidence surface as one surface of a scale having a transparent parallel portion, and the second optical grating is formed on the other surface of the scale.

13. A method according to claim 11, wherein the first and second optical gratings are comprised of a common grating disposed between a light source and a light-reflecting surface.

14. A method according to claim 13, wherein the common grating is formed on a beam incidence surface of a scale having a transparent parallel portion, and the light-reflecting surface is formed on the other surface of the scale.

15. A method according to claim 13, wherein the common grating is formed on a beam incidence surface of a scale having a transparent parallel portion, and a mirror member having a light-reflecting surface is arranged independently of the scale.

16. A method according to claim 11, wherein the first and second optical gratings have the same grating pitch.

17. A method according to claim 11, wherein the first and second optical gratings have different grating pitches.

18. A driving system having a displacement measuring apparatus, comprising:
 a driving mechanism; and
 a displacement measuring apparatus for measuring a drive state of said driving mechanism,
 said displacement measuring apparatus including:
 a scale mounted on a displacement portion of said driving mechanism;
 a first optical grating formed on said scale,
 a second optical grating formed on said scale,
 an optical system for projecting a beam, having a focal point located between said first and second optical gratings, onto said first optical grating, wherein the beam is split into overlapping diffracted light components forming diffracted images on said second optical grating shifted in a direction opposite to the displacing direction of said first optical grating; and means for measuring the relative displacement information between said optical system and said scale by detecting the beam having passed through the second optical grating.

19. An apparatus for detecting displacement information, including:
 an optical grating;
 a first optical member for projecting a beam, having a focal point located at an opposite side of said first optical member with respect to said optical grating, wherein the beam is split into diffracted light components;
 a second optical member for projecting the beam back onto said optical grating, wherein diffracted images as a result of overlapping of the diffracted light components are formed on said optical grating and are shifted in a direction opposite to the displacing direction of said optical grating; and
 means for detecting displacement information of said optical grating relative to said first optical member by detecting the diffracted images having passed through said optical grating.

20. An apparatus according to claim 19, wherein said optical grating is provided on a surface of a transparent plate, and said second optical member comprises a mirror member arranged at the focal point for reflecting the beam.

21. An apparatus according to claim 20, wherein said mirror member is arranged to form the diffracted images on said optical grating at a portion from which the beam from said first optical member is radiated.

22. An apparatus for detecting displacement information of an optical grating, comprising:
 a first optical member for projecting a beam, having a focal point located at an opposite side of said first optical member with respect to the optical gratings wherein the beam is split into diffracted light components;
 a second optical member for projecting the beam back onto the optical grating, wherein diffracted images as a result of overlapping of the diffracted light components are formed on the optical grating and are shifted in a direction opposite to the displacing direction of the optical grating; and
 means for detecting displacement information of the optical grating relative to said first optical member by detecting the diffracted images having passed through the optical grating.

* * * * *

UNITED STATES PATENT AND TRADEMARK OFFICE
CERTIFICATE OF CORRECTION

PATENT NO. : 5,327,218
DATED : July 5, 1994
INVENTOR(S) : Igaki

It is certified that error appears in the above-indentified patent and that said Letters Patent is hereby corrected as shown below:

[57] ABSTRACT:

Line 10, "image of the" (second occurrence) should be deleted.

COLUMN 3:

Line 10, "P + 1, and P - 1." should read $P_{+1}$ and $P_{-1}$.--.

COLUMN 8:

Line 38, "gratings" should read --grating,--.

Signed and Sealed this

Fourth Day of April, 1995

Attest:

BRUCE LEHMAN

Attesting Officer

Commissioner of Patents and Trademarks